United States Patent
Dube et al.

(10) Patent No.: US 10,474,509 B1
(45) Date of Patent: Nov. 12, 2019

(54) COMPUTING RESOURCE MONITORING AND ALERTING SYSTEM

(71) Applicant: FMR LLC, Boston, MA (US)

(72) Inventors: Bikash Dube, Flower Mound, TX (US); Brian R. Young, Irving, TX (US); Kevin Goss, Highland Village, TX (US); Stephen C. McKee, Keller, TX (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/163,185

(22) Filed: Oct. 17, 2018

(51) Int. Cl.
*G06F 9/50* (2006.01)
*G06F 9/455* (2018.01)

(52) U.S. Cl.
CPC .......... *G06F 9/5077* (2013.01); *G06F 9/4552* (2013.01); *G06F 9/45558* (2013.01); *G06F 9/5016* (2013.01); *G06F 2009/45583* (2013.01); *G06F 2009/45591* (2013.01); *G06F 2009/45595* (2013.01)

(58) Field of Classification Search
CPC .... G06F 9/5077; G06F 9/4552; G06F 9/5016; G06F 9/45558; G06F 2009/45595; G06F 2009/45583; G06F 2009/45591
See application file for complete search history.

(56) References Cited

U.S. PATENT DOCUMENTS

| | | | |
|---|---|---|---|
| 7,610,377 B2 | 10/2009 | Petit | |
| 7,725,572 B1 | 5/2010 | Kautzleben | |
| 8,005,950 B1 * | 8/2011 | Ashcraft | G06F 9/5016 709/224 |
| 8,166,152 B1 | 4/2012 | Delcheva et al. | |
| 8,959,515 B2 * | 2/2015 | Qin | G06F 9/4881 709/223 |
| 8,966,495 B2 * | 2/2015 | Kulkarni | G06F 9/45558 718/105 |
| 9,367,379 B1 * | 6/2016 | Burke | G06F 9/546 |
| 10,321,342 B2 * | 6/2019 | Ronen | H04W 24/08 |
| 2005/0005018 A1 * | 1/2005 | Datta | G06F 9/5016 709/229 |
| 2009/0070776 A1 * | 3/2009 | Dahlstedt | G06F 9/5016 719/312 |
| 2011/0258688 A1 | 10/2011 | Peterson et al. | |
| 2013/0014107 A1 * | 1/2013 | Kirchhofer | G06F 9/5083 718/1 |
| 2013/0047198 A1 * | 2/2013 | Srour | G06F 9/485 726/1 |

(Continued)

*Primary Examiner* — Benjamin C Wu
(74) *Attorney, Agent, or Firm* — Proskauer Rose LLP

(57) ABSTRACT

Systems and methods for monitoring one or more servant regions of an application server. A processor in electronic communication with the application server identifies one or more servant regions of the application server; requests to the application server to receive one or more performance metrics for each of the one or more servant regions, the performance metrics included in a virtual resource statistics module for collecting and reporting available resource data; receives from the application server first information including the one or more performance metrics for each of the one or more servant regions; extracts from the first information the one or more performance metrics for each of the one or more servant regions of the application server; and determines, based on the one or more performance metrics, whether to generate an alert message.

23 Claims, 7 Drawing Sheets

(56) References Cited

U.S. PATENT DOCUMENTS

| | | | |
|---|---|---|---|
| 2014/0215184 A1* | 7/2014 | Branson | G06F 15/80 |
| | | | 712/30 |
| 2014/0223098 A1* | 8/2014 | Lee | G06F 9/5016 |
| | | | 711/118 |
| 2015/0019715 A1* | 1/2015 | Ronen | H04W 24/08 |
| | | | 709/224 |
| 2017/0102979 A1* | 4/2017 | Ramirez | G06F 11/079 |

* cited by examiner

JVM Heap Statistics

| Server  | SERVANTID        | FREE(MB) | TOTAL(MB) | MAX(MB) | ALARM |
|---------|------------------|----------|-----------|---------|-------|
| wfot014 | 00000A8400000005 | 120.39   | 537.88    | 1024    | NO    |
| wfot018 | 00000B1400000004 | 100.18   | 538.88    | 1024    | YES   |
| wfot024 | 00000A7800000001 | 412.96   | 640.0     | 1024    | NO    |
| wfot034 | 00000A9000000005 | 428.43   | 570.13    | 1024    | NO    |
| wfotec4 | 00000A7400000001 | 95.26    | 256.13    | 512     | YES   |
| wfotec8 | 000001700000526  | 49.23    | 318.75    | 512     | YES   |
| wfotec3 | 00000E3000001122 | 75.60    | 320.0     | 512     | YES   |
| wfotic4 | 00000A8000000005 | 317.84   | 723.63    | 1536    | NO    |
| wfotic8 | 00000B1000000003 | 268.1    | 768.0     | 1536    | NO    |
| wfotie2 | 00000A0000000001 | 299.61   | 568.63    | 1024    | NO    |
| wfotie8 | 00000B1800000004 | 361.49   | 601.38    | 1024    | NO    |
| wfotts4 | 00000A8800000002 | 284.97   | 565.0     | 1536    | NO    |
| wfotts8 | 00000B0C00000002 | 218.49   | 578.25    | 1536    | NO    |

FIG. 6

COMPUTING RESOURCE MONITORING AND ALERTING SYSTEM

FIELD OF THE INVENTION

This application relates generally to systems, methods and apparatuses, including computer programs, for monitoring computing resources. More specifically, this application relates to monitoring sub-modules of a distributed computing platform, for example multi-servant java virtual machines in a WebSphere Application Server for z/OS, and generating system performance alerts.

BACKGROUND

Java-based web applications can be hosted on a variety of application servers, e.g., IBM's WebSphere Application Server (WAS) for z/OS. On WAS for distributed platforms, an application server includes only one address space, which corresponds to a single java virtual machine (JVM). However, on z/OS, an instance of an application server actually includes at least two sets of distinct address spaces. This mismatch creates the potential for errors and incompleteness in system resource monitoring and reporting. FIGS. 1 and 2 below provide context and explanation to illustrate this problem in detail.

FIG. 1 is prior art a schematic diagram of an exemplary WAS architecture 100 for z/OS having an application server 102 and two distinct address spaces 104, 108. The first set of address spaces 104 corresponds to a "controller," or "controller region," which receives incoming requests 112 from one or more clients 114 (typically via HTTP), creates a Work Load Manager (WLM) Enclave 116, and queues up the incoming requests 112 to delegate units of work 120 to be completed (e.g., individual units of work 120A, 120B, 120C) to one or more "servants" or "servant regions" (e.g., servants 108A, 108B, 108C) within the server 102. The second set of address spaces 108 corresponds to the one or more servants 108A, 108B, 108C themselves, which are the points of execution of applications (e.g., EJBs, Servlets, etc.) deployed to the server 102 to handle the incoming requests 112 and perform work. An optional third set of address spaces (not shown) corresponds to one or more adjunct regions, which are specialized servant regions that interface with service integration buses to provide additional services, e.g., messaging services within the distributed platform.

After the servants 108A, 108B, 108C execute the units of work 120 (e.g., individual units of work 120A, 120B, 120C) and generate responses 124 (e.g., individual responses 124A, 124B, 124C), the responses 124 are then relayed back to the controller 104 and onto the client 114. If required, the WLM Enclave 116 provides a key avenue for easy vertical scaling to handle more work requests. On distributed platforms, this type of vertical scaling can be tedious, e.g., because it requires clustering and redefining of incoming ports and address spaces. In the case of multiple servants, each servant has its own unique heap space in addition to its own address space and is considered a unique Java Virtual Machine (JVM).

Java-based web applications can be built in J2EE, which is a platform-independent, Java-centric environment for developing, building and deploying web-based enterprise applications online. The J2EE platform includes a set of services, application programming interfaces (APIs), and protocols that provide the functionality for developing multi-tiered, web-based applications. The J2EE Management Specification is a Java Specification Request, JSR-77, that defines an interface for accessing management information. The goal of JSR-77 is to abstract the fundamental manageable aspects of the J2EE architecture to provide a well-defined model for implementing instrumentation and information access. In addition, JSR-77 defines a standardized API for interoperating with J2EE components that participate in the monitoring and control of the J2EE platform's resources. One of the key features of JSR-77 is its ability to aid in extracting information via management objects. JSR-77 is founded upon Java Management Extensions (JMX), which utilizes the underlying Management Beans (Mbeans) of a J2EE-compliant server. MBeans are virtual objects running inside a server that provide methods to display attributes, operations and notifications providing statistical data.

FIG. 2 is a prior art schematic diagram of an exemplary Performance Monitoring Infrastructure (PMI) architecture 200 of a WAS on z/OS. The PMI architecture 200 includes PMI clients 204 and a server 208 which are in electronic communication with each other. The PMI architecture 200 provides server-side monitoring and a client-side API to retrieve performance data, maintaining statistical data within the entire WAS domain (which can include one or more servers). Each server organizes PMI data into modules (e.g., modules 212, 216, 220, 224) and sometimes submodules. The implementation of JSR-77 in WAS is implemented via the PMI. The PMI framework includes the PMI service, which should be enabled for PMI data to be collected. A given WAS cell can have multiple nodes, typically across different logical partitions, and each node can have multiple servers in the node. In the case of z/OS, each of the servers can also have multiple servants as part of the server, where each servant is a unique address space or JVM with its own attributes.

PMI "modules" or "resource modules" can represent categories for which data is collected and reported via the client API for certain system resources. The resources can include a JVM including one or more servants 214 (e.g., 214A, 214B, 214C), a ThreadPool 216, a JDBCProvider 220, and other statistics provider modules 224, such as Connection Pools for JDBC, and/or JCA/MQ.). Each of these modules has a corresponding MBean (for example, the jvmRuntimeModule is the corresponding module for the JVM MBean). Some of these modules also include submodules: for example, the ThreadPool module 216 includes submodules such as the ORB Thread Pool and WebContainer Thread Pools (not separately depicted). The Performance MBean (Perf MBean) 228 permits the PMI clients 204 to configure the PMI Service for the servers and facilitates collection of data counters (e.g., statistics) via the PMI Modules and Submodules of the servers. The server 208 itself has a Server Mbean 232, which provides server level attribute information (e.g., process ID, name of the cell, etc.) and operational abilities to start and/or stop all the servants of a server. However, JSR-77 leaves it up to specific vendors (e.g., JBoss, WebLogic, IBM, etc.) to implement details of different statistics and metrics that they want to provide through their individual and unique implementations.

WAS for z/OS's architecture (including the control region and servants within the same server as shown above in FIG. 1) follows a separate architecture from typical distributed platforms. Traditional JMX clients utilize the Perf MBean 228 of a given server 208 to collect performance metrics, which in the case of z/OS does not provide information about multiple servants and their details, such as the heap size or the current total free heap. In fact, in the case of a multi-servant JVM, the statistics of the control region are incorrectly added to the first servant of a JVM, rendering the statistics relayed by traditional clients (e.g., Tivoli Performance Viewer) inaccurate. The J2EE specification inherently cannot address vendor-specific features, which is why further standardization has been developed through the Java Specification Request.

Any WebSphere application server can have MBeans that either do not provide any statistics or that have an attribute called "StatisticProvider" set to true (JSR77.6.2). The Perf MBean can collect these JSR-77 compliant PMI statistical data from the individual MBeans and store them in a nested structure that can provide all PMI data with counters for all of the MBeans in the server. The stats attribute from the stats subinterface (JSR77.6.10) of an individual MBean & Statistic subinterfaces (JSR77.6.4) of the Perf MBean provide the necessary methods to retrieve this information, which are widely used by vendors for monitoring the performance and health of the servers.

For JVMs in this environment, the jvmRuntimeModule of the JVM MBean provides the following counters with the "BASIC" level of PMI Service: (1) HeapSize (type=BoundedRangeStatistic); (2) UpTime (type=CountStatistic); (3) UsedMemory (type=CountStatistic); (4) ProcessCpuUsage (type=CountStatistic). Different types of statistical objects (CountStatistic, TimeStatistic, RangeStatistic, BoundedRangeStatistic and BoundaryStatistic) are part of JSR-77. IBM publishes the Java methods to get values for the different types and counters of the Statistic objects that can be used for Performance Monitoring.

Much of the PMI Architecture on z/OS is similar to the distributed platforms; however, since a single server can have multiple servants the current PMI architecture and JSR-77 implementation do not capture the JVM memory details, which are not covered in the specifications. Moreover, there are no published APIs for extracting the heap statistics of servant JVMs within a server via the PMI architecture on z/OS. The JVM stats attribute of a server and the Perf MBean Statistic attribute of the JVM MBean currently report only the counters for the first servant JVM of the server. These values are erroneous, since the UsedMemory and HeapSize of the controller are added to the counters that are reported for the JVM MBean. Thus, PMI architecture does not provide the means to monitor the performance of servant JVMs of a server on z/OS. Commercial and publicly available tools (which are almost always Java-based) utilize the Perf MBean method of extraction of counters statistics, since all available statistics can be extracted with just one JMX call to the Server MBean.

These deficiencies result in meaningful practical consequences for monitoring of distributed computing resources. For example, memory leaks in distributed computing architectures and/or thread pool saturation of various Database, Messaging and Request Broker resources, which can go unnoticed or misunderstood under the current regime, result in large problems for enterprise industries. Collection of such key performance metrics can also help enterprises plan for capacity and analyze trends for better predicting resource usage at various time periods of a day, month or year leading to performance optimization and cost savings. The historical data collected via the overall technology also adds capability to utilize machine learning and artificial intelligence for creating self-healing computing systems.

SUMMARY

A complete end-to-end monitoring and alerting system, e.g. for multiple servants of a JVM in WAS for z/OS, which does not rely on the JSR-77 based PMI architecture of WAS, is described herein. A unique approach is undertaken to query the JVM Bean, which lists multiple servants of a given server as a Jython List, instead of the Perf Mbean. Regular expression techniques are then used to extract pertinent information from the JVM MBean. This approach bypasses the need for any special API or MBean to gather metrics on the servants of a given JVM server and develop an alerting system around it. In some embodiments, Jython 2.1 scripting and Custom REXX code in z/OS are used to bypass the JSR-77-based PMI architecture.

In some embodiments, the invention includes an alerting solution that utilizes a custom algorithm to detect JVM memory exhaustion. The algorithm can use write-to-operator messages from the z/OS Unix system services from within the Jython script to log messages to the z/OS SYSLOG. In some embodiments, the invention includes a custom REXX script that listens to the predefined messageID of an incoming message in SYSLOG to generate an alert and send to a monitoring application (e.g., Fidelity's jMagic™). In some embodiments, the invention includes a custom JCL z/OS script that can execute a wsadmin script through a scheduler, writing the detailed JVM information in z/OS GDG datasets for analysis and historical storage.

In some embodiments, the invention includes a custom Jython 2.1 code for the wsadmin interface of WAS with logic to detect individual servants of a given server and all the servers in a cell. In some embodiments, the invention includes a unique algorithm that detects if a given servant is running low on memory without relying on external garbage collection cycle information. In some embodiments, the invention includes a custom Jython routine that emulates the MVS Write-To-Operator system from the UNIX system services to send messages to the MVS Console and SYSLOG. In some embodiments, the invention includes a custom algorithm and logic developed in OPS/MVS REXX that traps incoming messages to MVS SYSLOG and send alerts to jMagic™ to engage personnel and provide additional notification or action. In some embodiments, the invention includes a JCL script utilizing BPXBATCH and IKJEFT01 routines of z/OS to execute wsadmin-based Jython scripts and print WAS monitor reports (in both the Unix system services as well as z/OS via Generational Data Group datasets).

In some embodiments, a portion of the invention can be applied to WAS on distributed platforms to help save expenses on the distributed servers. Distributed platforms do not have multiple servants for the same JVM and currently do have some commercial vendors providing some monitoring solution based on the JSR-77 standard. However, the present invention can be implemented on distributed platforms leveraging the Jython 2.1 wsadmin interface.

In one aspect, the invention features a computerized method of monitoring one or more servant regions of an application server (e.g., a JVM on an application server). The method includes identifying, by a processor in electronic communication with the application server, one or more servant regions of the application server. The method also includes requesting, by the processor, to the application server, to receive one or more performance metrics for each of the one or more servant regions, the performance metrics included in a virtual resource statistics module for collecting and reporting available resource data. The method also includes receiving, by the processor, from the application server, first information including the one or more performance metrics for each of the one or more servant regions. The method also includes extracting, by the processor, from the first information, the one or more performance metrics for each of the one or more servant regions of the application server. The method also includes determining, by the processor, based on one or more performance metrics, whether to generate an alert message.

In some embodiments, the one or more performance metrics include, for each of the one or more servant regions, at least a free memory, a total memory, and a maximum total memory. In some embodiments, determining whether to generate an alert message further comprises: computing, by the processor, for each of the one or more servant regions, a quotient of the total memory and the maximum total memory; and if at least one quotient is below a predetermined threshold and the free memory falls below a free memory threshold level: generating, by the processor, a first alert message; and sending, by the processor, the first alert message to a first alert message receiving module. In some embodiments, the first alert message receiving module is a Multiple Virtual Storage (MVS) console, an operating system log, or an alert management application.

In some embodiments, the method includes sending the first alert message to an alert consolidation tool, the alert consolidation tool configured to alert appropriate personnel. In some embodiments, the one or more performance metrics include at least one of JVM heap space usage (from which free memory can be inferred), a JVM total heap space (total memory), a JVM maximum heap space (maximum total memory), a CPU usage, JDBC pool connections, JMS pool connections, or Threadpool connections. In some embodiments, the one or more performance metrics are included in an MBean of the application server for each of the one or more servant regions. In some embodiments, generating the first alert message does not rely on external garbage collection cycle information.

In some embodiments, requesting the one or more performance metrics includes bypassing at least one of a Perf MBean or a JSR-77 object. In some embodiments, the first information is provided in one or more unformatted strings including a memory in bytes for a controller of the application server, at least one memory statistic for each servant region of the application server, and a hexadecimal identifier for each servant region of the application server. In some embodiments, extracting the one or more performance metrics from the first information includes parsing and formatting the first information to obtain at least a free memory and a total memory for each servant region. In some embodiments, the method also includes creating a monitor report using a Jython script.

In some embodiments, the method includes generating a report including one or more of a server identifier, a servant region identifier, a free space, a total space, a maximum space, or an alarm indicator. In some embodiments, the report is generated using an MVS Job Control Language (JCL) script. In some embodiments, generating the first alert message further comprises using an algorithm to detect JVM memory exhaustion, a Jython routine using write-to-operator messages to log messages to an MVS console and a system log tagged with a unique message identifier via a Jython function. In some embodiments, the method includes monitoring a predefined message identifier of the alert message to generate a system alert and send the system alert to a monitoring application. In some embodiments, the method includes writing detailed information relating to the application server in an MVS generation data group dataset used for at least one of data analysis or historical storage.

In some embodiments, determining whether to generate an alert message further comprises: determining, by the processor, for each servant region, when a quotient of a total heap size and a maximum heap size exceeds a predefined tolerance level; determining, by the processor, for each servant region, an actual free memory level; and/or sending, by the processor, a message to an operating system log when, for at least one servant region, (i) the quotient of the total heap size and the maximum heap size exceeds the tolerance level, and (ii) the free memory falls below a free memory threshold. In some embodiments, the tolerance level is 98% of the maximum memory and the free memory threshold is 2% of the maximum memory, if maximum memory is less than or equal to 4 GB, and 1% of the maximum memory if maximum memory is greater than 4 GB.

In some embodiments, the method includes generating a system alert if a specified number of alert messages is generated in a specified time interval. In some embodiments, the method includes sending the system alert to an alert management tool. In some embodiments, the specified number of alert messages is five and the specified time interval is twelve minutes, for a case in which monitoring occurs every 90 seconds and each iteration of the Jython script finishes in about 15 seconds.

In another aspect, the invention features a system for monitoring one or more servant regions of an application server. The system includes an application server having a controller in electronic communication with one or more servant regions. The system also includes a data processor (e.g., of a client) in electronic communication with the application server. The data processor is configured to identify the one or more servant regions of the application server; request to receive one or more performance metrics for each of the one or more servant regions, the performance metrics included in a virtual resource statistics module for collecting and reporting available resource data; receive, from the application server, first information including the one or more performance metrics for each of the one or more servant regions; extract, from the first information, one or more performance metrics for each of the one or more servant regions of the application server; and determine, based on the one or more performance metrics, whether to generate an alert.

In another aspect, the invention features a computer-implemented system comprising an alerting module and an external server. The system is configured to receive, by an alert interface of the alerting module, an alert; translate, by the alerting module, the alert into an XML message; send, by the alerting module, the XML message via TCP/IP to an external server; receive, by the external server, the XML message; interpret, by the external server, the XML message to a form displayable for a monitoring technician; and display, by the external server, the form displayable for a monitoring technician.

In another aspect, the invention features a computer-implemented system comprising a relational database that stores key performance metrics collected through the multi-threaded Jython script for trend and historical analysis, model generation, predictive analytics, machine learning and artificial intelligence to create self-healing and self-sustaining computing system.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead generally placed upon illustrating the principles of the invention.

FIG. 6 is an illustration of a sample report showing JVM Heap Statistics, according to an illustrative embodiment of the invention.

DETAILED DESCRIPTION

Figure 1:
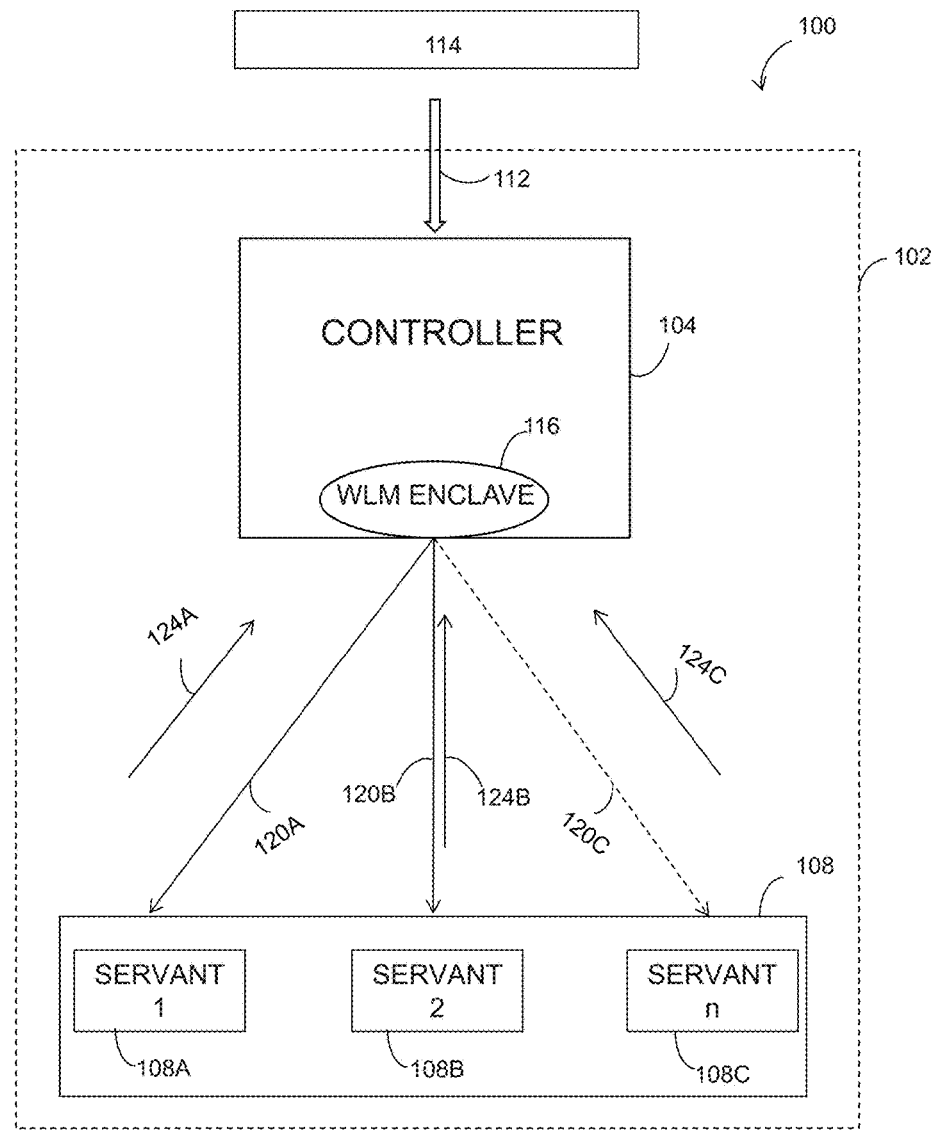
FIG. 1 is a schematic diagram of an exemplary prior art WebSphere Application Server architecture on z/OS.
Figure 2:
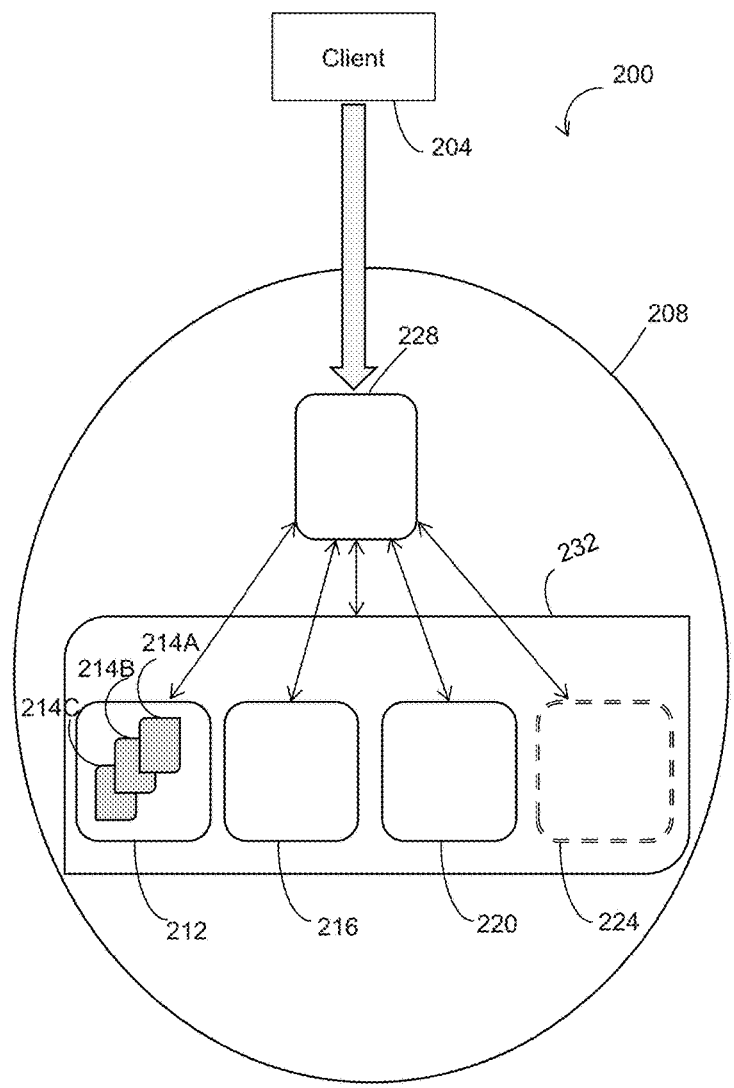
FIG. 2 is a schematic diagram of an exemplary prior art Performance Monitoring Infrastructure (PMI) architecture of a WebSphere Application Server on z/OS.
Figure 3:
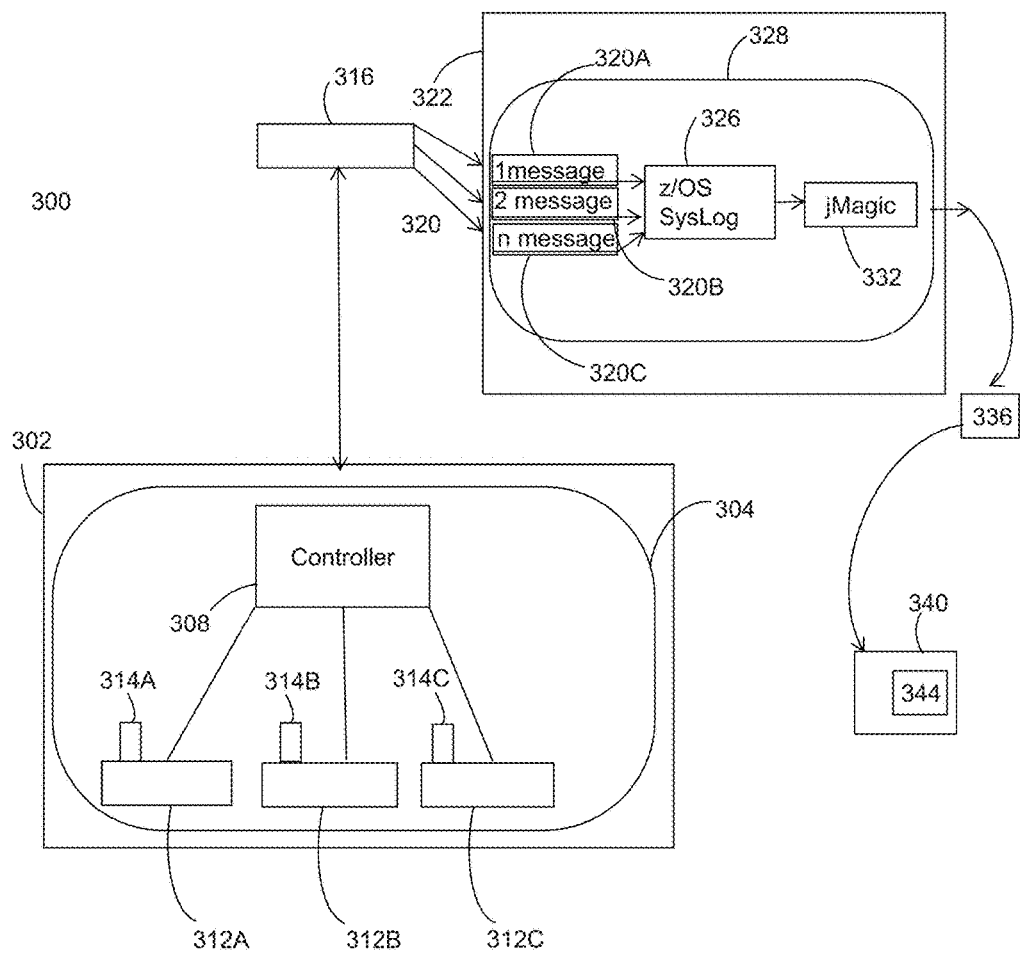
FIG. 3 is a schematic diagram of a system architecture for monitoring one or more servants of a Java Virtual Machine (JVM), according to an illustrative embodiment of the invention.

FIG. 3 is a schematic diagram of a system architecture for monitoring one or more servants of a Java Virtual Machine (JVM), according to an illustrative embodiment of the invention. The system architecture 300 includes a server 302 having a JVM 304. The JVM 304 includes a controller 308 and servants 312 (e.g., 312A, 312B, 312C) in electronic communication with the controller 308. The server 302 is in electronic communication with a data processor, e.g., a client 316 having a data processor.

The data processor is configured to identify the one or more servant regions 312A, 312B, 312C of the application server 302. The data processor is also configured to request to receive one or more performance metrics for each of the one or more servant regions 312A, 312B, 312C, the performance metrics included in a virtual resource statistics module (314A, 314B, 314C, respectively) for collecting and reporting available resource data. The data processor is also configured to receive, from the application server 302, first information including the one or more performance metrics for each of the one or more servant regions. The data processor is also configured to extract, from the first information, one or more performance metrics for each of the one or more servant regions of the application server. The data processor is also configured to determine, based on the one or more performance metrics, whether to generate an alert message 320 (e.g., alert messages 320A, 320B, 320C). The system architecture 300 bypasses the JSR-77 based PMI architecture, allowing one or more individual performance metrics (e.g., JVM statistics included in a virtual resource statistics module for collecting and reporting available resource data) to be queried directly, logged, and analyzed to determine whether an alert message 320 should be generated.

The system architecture 300 also includes a computer-implemented system comprising an external server 322 and an alerting module 324 (e.g., included within the external server 322). The system is configured to receive, by an alert interface 332 of the alerting module 332, an alert message 320 (320A, 320B, 320C); translate, by the alerting module 332, the alert message into an XML message 336; send, by the alerting module 332, the XML message 336 via TCP/IP to an external server 340; receive, by the external server 340, the XML message 336; interpret, by the external server 340, the XML message 336 to a form displayable for a monitoring technician 344; and display, by the external server 340, the form displayable for a monitoring technician 344.

The improved querying can begin with a Jacl/Jython 2.x based scripting interface called wsadmin, which IBM provides for administering, deploying, managing, configuring and monitoring of run time components in WebSphere Application Server environments. Jython is the java implementation of Cpython, and connections can be made over SOAP, RMI, JSR160RMI, and/or IPC connectors. Starting with version 6 of WAS, Jython is the default supported language for scripting in WebSphere based computing systems.

In wsadmin there are five primary objects that are used (Help, AdminApp, AdminConfig, AdminControl and AdminTask) to access MBeans for manipulation. From a monitoring perspective, AdminConfig and AdminControl are particularly important. Wsadmin can be configured to connect to either a running server or to the deployment manager to which it belongs. The following two wsadmin calls are integral to the monitoring of the servant regions:

freeMemList=AdminControl.invoke(jvmString, "getFreeMemory( )")

totalMemList=AdminControl.invoke(jvmString, "getTotalMemory( )")

freeMemList=AdminControl.getAttribute(jvmString, 'freeMemory') is analogous totalMemList=AdminControl.getAttribute(jvmString, 'heapSize') is analogous where jvm=AdminControl.queryNames('*:process='+srvrname+', type=JVM, *')

Description: Management interface to provide current settings for the running Java Virtual Machine (JVM).

Class name: javax.management.modelmbean.RequiredModelMBean

In the above, srvrname is a variable used to feed the names of all the servers in a loop to extract all the servants of all the servers in a given network deployment manager cell. The type=JVM feature exists to bypass the Perf MBean and JSR77 objects completely, querying only the JVM MBean of a given server without engaging the stats interface.

In the case of z/OS, the response is an unformatted string with the memory in bytes for the controller and the servants, along with a 16 character hexadecimal process ID (pid) for the servant. This is tagged as the ServantID for identifying the unique JVM at runtime, and regular expressions (regex) are applied for parsing and formatting the output from the calls to getFreeMemory( ) and getTotalMemory( ) in a loop for all the servants of a server.

wsadmin>freeMemList

'Controller: 48812264; \nServant 0000017C00000526: 79652664; \nServant 00000E2800000122: 76006752;' wsadmin>type(freeMemList)

<jclass org.python.core.PyString at −1112979068> wsadmin>totalMemList

'Controller: 147193856;\nServant 0000017C00000526: 335544320;\nServant 00000E2800000122: 335544320;'

Memory management in JVMs is done via a built-in garbage collection mechanism, which manages the allocation and de-allocation of memory based on workload inside the JVMs. All servers have a defined minimum (−Xms) and maximum (−Xmx) limit for the JVM, which signifies the lower and upper bound that the garbage collection works within during the life of the server. Over the course of the execution, the Java Heap expands and contracts within these limits. The goal of monitoring the memory usage of JVMs is to detect situations where memory management via the garbage collection is inadequate in terms of releasing enough memory for new and fresh objects. This typically happens when the entire Java Heap has expanded to the max memory limit (−Xmx) and is unable to release memory (e.g., because of memory leak, operating system issues and other application issues). Since the total heap size and the free heap size fluctuate, a user-defined algorithm is required to detect situations in which the maximum limits from which recovery may no longer be possible by garbage collection are reached.

In one exemplary embodiment, a tolerance level jvmTolerance is defined as a percentage of the maximum memory that the total heap size has to breach in order to cause a concern. For typical WebSphere cells, jvmTolerance can be set to 98% of the maximum memory of the server. In cases in which cells have leaky applications deployed, the jvmTolerance can be set to lower values in order to detect "out-of-memory" issues or other memory issues before they escalate to a problematic level. The max memory is inherited by all servants of the JVM in WebSphere servers in z/OS.

A second relevant variable is the actual free memory called jvmAlertLevel, expressed in percentage of the maximum memory, which can be set to a low number (e.g., 2% of the maximum memory if maximum memory is less than or equal to 4 GB and 1% of the maximum memory is greater than 4 GB) so that an alert is generated when the free memory is lower than the jvmAlertLevel. A message 320A to the z/OS SYSLOG 324 is sent only when both the conditions are met. Further logic is implemented in OPS/MVS REXX to wait for n number of these SYSLOG console messages (320A, 320B, 320C, etc.) in a given time period t before sending an alert 328 to jMagic™ 332. jMagic™ 332 is the actual monitor and alert application used to notify personnel of a system distress.

In Jython, the above technique can be implemented as follows:

```
jvmTolerance=0.98 # If Total Heap is within 98% of the Max (−Xmx) Heap/Memory
jvmAlertLevel=50 # Free Heap in megabytes i.e. If Free-Heap falls to 50 MB or less
   ### JVM Memory Alert Logic
   ALARM1=' '
   if totalMemory>=(jvmTolerance*maxMemory): #Total Heap is now nearing Max-Memory
     if int(freeMemory)<=int(jvmAlertLevel): #Free Heap is now in alert zone
        alertString=('HEAP: Free Heap of Servant: '+servantID+' in SERVER: '+servername+' in CELL: '+cellName+\
           'on LPAR: '+lparName+' is AT: '+str(round(freeMemory,2))+'MB'+'MAXMEMORY: '+str(maxMemory)+'MB'\
           'TOTAL: '+str(round(totalMemory,2))+'MB'+' TOLERANCE: '+'%05.2f'% (jvmTolerance*100)+'%'+\
           'THRESHOLD: '+str(jvmAlertLevel)+'MB') createAlert(alertString)
        ALARM1='YES'
   ### End JVM Memory Alert Logic
Where
maxMemory=int(float(AdminControl.invoke(jvmString, "getMaxMemory( )"))/1024/1024)
cellName=AdminControl.getCell( )
   #maxMemory=int(float(AdminControl.getAttribute(jvm, 'maxMemory'))/1024/1024) is analogous
```

In the above, freeMemory is the amount of free memory of an individual servant, and totalMemory is the size of the heap to which the servant JVM has expanded, with maxMemory (−Xmx) being the upper bound to which it can theoretically grow. The createAlert component is a custom write-to-operator Jython function that has been written to send messages to z/OS SYSLOG 324 with a special messageID that can be trapped by the REXX code and used for further processing.

The following Jython loop can be used to calculate the freeMemory and heapSize/totalMemory of an individual Servant of a JVM:

```
   servantIDs=re.findall(servantIDPattern,freeMemList) # Find all hex16 matches following "Servant"
   #all Servants=re.findall('(?:Servant\s)(\w+):+',totalMemList) is analogous
   servantFreeBytes=re.findall(servantBytesPattern, freeMemList)
   servantTotalBytes=re.findall(servantBytesPattern,totalMemList)
   for current in xrange(len(servantIDs)): # Since each servant has a corresponding free and total at same index
     servantID=servantIDs[current]
     freeMemoryString=servantFreeBytes[current]
        freeMemory=float(freeMemoryString)/1024/1024
     totalMemoryString=servantTotalBytes[current]
     totalMemory=float(totalMemoryString)/1024/1024
```

In addition, the following Jython function can be used to create Write-To-Operator messages and send custom alerts to the z/OS console/SYSLOG directly from within the UNIX system services where the Jython code runs:

```
def createAlert (contents):
   try:
     command='Logger-d1-a'+messageID+'"'+contents
     os.system(command) #
   except OSError:
     print "WASMONITOR: OSError, Check with PerfWAS"
   except ScriptingException:
     print "Error:\n"+str(sys.exc_info( )[1])
   return
```

Only the following messages are trapped by the REXX code for further processing: messageID='WASMONITOR' # REXX code will only alert if this message ID is set An example console message (with the WASMONITOR messageID) from the SYSLOG is shown below:
SDSF SYSLOG 106461.113 SYSF SYSF 03/13/2017 2W CHARS 'HEAP' FOUND
COMMAND INPUT===>SCROLL===>CSR
N 8000000 SYSF 17072 16:35:21.15 50164641 00000080+
WASMONITOR: A593669: 33752755: HEAP: Free Heap of Servant 0000017C00000
S 526 in in wfotec8 in fotcell is 49.23 MB Additional logic and algorithms can be implemented in the OPS/MVS REXX layer for trapping the 'WASMONITOR' console messages and sending the alert to jMagic™. The first algorithm, which is part of the Jython code, takes into account that the garbage collection is doing the actual management of the heap size, and so it is not a concern if the heap size has grown very close to the max size unless the free heap is also very low once the heap has maxed out (or nearly maxed out). To further smoothen the alerting logic, the system can wait for at least three (n=ct=3) console messages in a 15 minute time frame (t=secs=900 seconds), e.g., implemented using OPS/MVS REXX code. For context, OPS/MVS is the mainframe automation product from Computer Associates that can see any and all console messages generated by any process on the mainframe.

OPS/MVS has a rules engine that can take specific actions based on a message ID and/or text contained in the message. Rules are coded in an OPS/MVS implementation of REXX. The combination of these two algorithms can signify that the JVM is under duress and is close to running out of memory, and/or is undergoing system performance issues. In code, it can be implemented the following way:

```
secs=15*60
    If aType='HEAP':' then
    do
    ct=3
    tKey=aType'-'t9
    end
```

Figure 4:
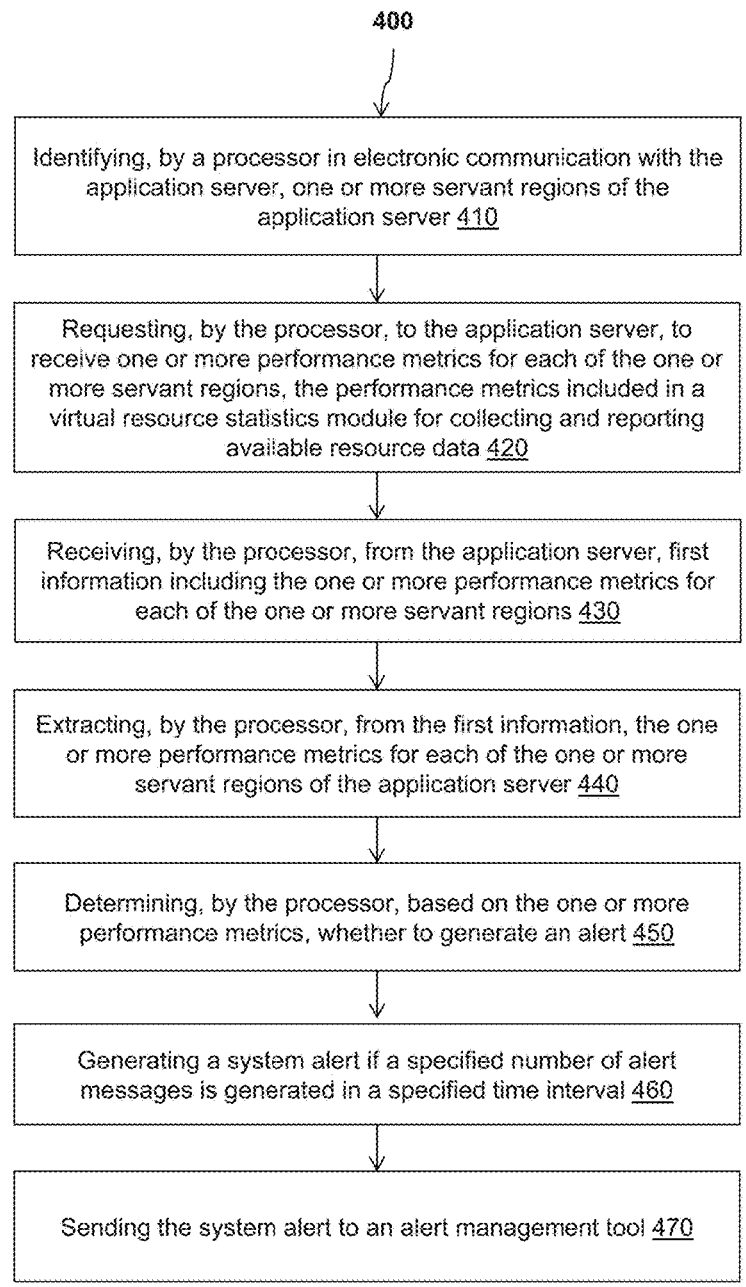
FIG. 4 is a flow diagram showing a computerized method of monitoring one or more servant regions of a java virtual machine, according to an illustrative embodiment of the invention.

FIG. 4 is a flow diagram showing a computerized method 400 of monitoring one or more servant regions of a java virtual machine, according to an illustrative embodiment of the invention. The method 400 can be implemented, for example, on the system shown and described above in FIG. 3. The method 400 includes a first step 410 of identifying, by a processor in electronic communication with the application server, one or more servant regions of the application server. The method includes a second step 420 of requesting, by the processor, to the application server, to receive one or more performance metrics for each of the one or more servant regions, the performance metrics included in a virtual resource statistics module for collecting and reporting available resource data. The method includes a third step 430 of receiving, by the processor, from the application server, first information including the one or more performance metrics for each of the one or more servant regions. The method includes a fourth step 440 of extracting, by the processor, from the first information, the one or more performance metrics for each of the one or more servant regions of the application server. The method includes a fifth step 450 of determining, by the processor, based on the one or more performance metrics, whether to generate an alert.

If an alert message is created, the message can be sent to the z/OS SYSLOG. Then, if n messages are recorded in the SYSLOG within a given time interval, an alert can be sent to jMagic™. FIG. 4 also shows method steps for generating system alerts. For example, the method 400 can also include a sixth step 460 of generating a system alert if a specified number of alert messages is generated in a specified time interval. The method 400 can also include a seventh step 470 of sending the system alert to an alert management tool. In some embodiments, the specified number of alert messages is five and the specified time interval is twelve minutes for a case in which monitoring occurs every 90 seconds and each iteration of a script used to generate the alert messages finishes in about 15 seconds.

Figure 5A:
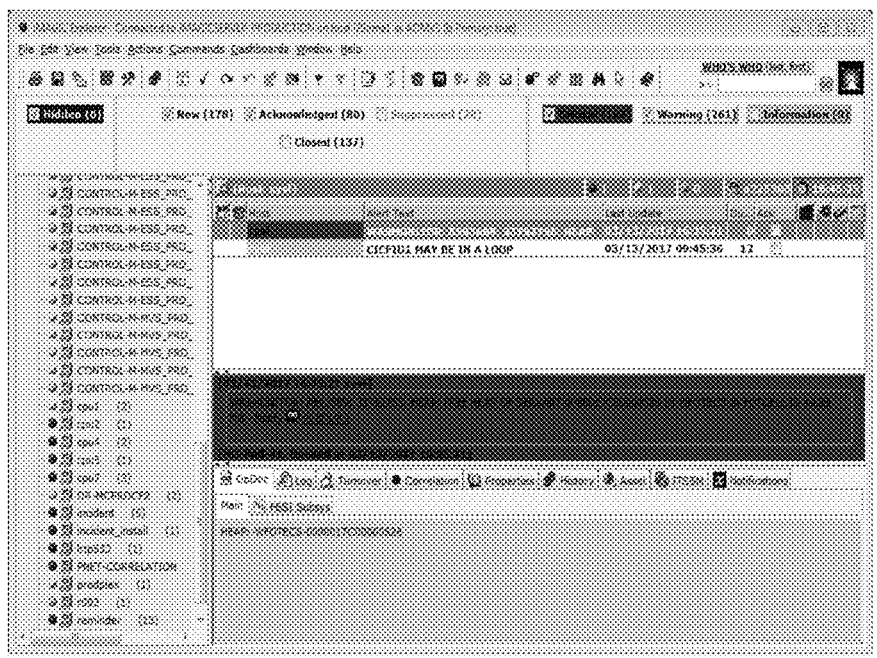
FIGS. 5A and 5B are screenshots of user interface of an system alert module, according to an illustrative embodiment of the invention.
Figure 5B:

FIGS. 5A and 5B are screenshots of user interface of an system alert module, according to an illustrative embodiment of the invention. FIG. 5A shows a screenshot of Fidelity's jMagic™ Explorer including the SYSPLEX "Alert View." Generally, jMagic™ is a core alerting system for an enterprise regardless of platform (including z/OS). In z/OS, an interface takes well-formed multi-line alert messages and translates them into XML. That XML is then sent via TCP/IP to a vendor message queue ("MQ") product (e.g., SonicMQ) outside the mainframe on a Linux server. jMagic™ can be running in the background and "listening" to several topics within MQ, translating XML for alerts to the alert view. Once an alert is seen by a technician, the technician can choose to escalate it as appropriate. jMagic™ also has mechanisms to automatically email or page the owning group.

As illustrated, the jMagic™ screenshot in FIG. 5A shows details for two logged alerts, including the Host (sysf for each), the Alert Text ("WASMONITOR: A593669 . . . " and "CICFID1 MAY BE IN A LOOP," respectively), and a time of Last Update (03/13/2017 16:35:21 and 03/13/2017 09:45:36 respectively) among other details.

FIG. 5B shows an exemplary HEAP Alert for a servant having Servant ID 000001700000526 of a server called WFOTEC8 in a cell called FOTCELL after the free HEAP of the servant is below the alert threshold of 50 MB defined in its configuration file, for a sustained period of time.

FIG. 6 is an illustration of a sample report showing JVM Heap Statistics, according to an illustrative embodiment of the invention. A JCL script is used for creating scheduled reports in MVS GDG datasets as well as UNIX file system to create reports and execute wsadmin. In the case of FIG. 6, the following JCL script was used to create scheduled reports in MVS GDG datasets as well as the UNIX file system:

```
//A593669C JOB (14285,DBMS),'DUBE',CLASS=8,
//       MSGCLASS=U,REGION=0M,NOTIFY=&SYSUID,USER=T$PRF1
/*JOBPARM SYSAFF=SYSF
//*****************************************************/
//* Create Report & Alerts for a given tWAS Cell **********/
//*****************************************************/
//* */
//WASMON EXEC PGM=BPXBATCH
//STDENV DD*
TMPDIR=/fidglbl/perfwas/twas/wstemp
/*
//STDIN DD PATH='/path/to/wsadmin.sh',
// PATHOPTS=ORDONLY
//STDOUT DD PATH='/fidglbl/perfwas/twas/report.out',
// PATHDISP=(KEEP,DELETE),
// PATHOPTS=(OWRONLY,OCREAT,OTRUNC),
// PATHMODE=(SIRWXU,SIRGRP,SIROTH)
//STDERR DD PATH='/fidglbl/perfwas/twas/report.err',
// PATHDISP=(KEEP,DELETE),
// PATHOPTS=(OWRONLY,OCREAT,OTRUN),
// PATHMODE=(SIRWXU,SIRGRP,SIROTH)
//*****************************************************
//* Copy HFS output files to SYSOUT, since BPXBATCH can only write
//* STDOUT and STDERR to HFS files.
//*****************************************************
//COPYSTEP EXEC PGM=IKJEFT01,DYNAMNBR=300,COND=(4,LT)
//SYSTSPRT DD SYSOUT=*
//HFSOUT DD PATH='/fidglbl/perfwas/twas/report.out'
//HFSERR DD PATH='/fidglbl/perfwas/twas/report.err'
//*STDOUTL DD SYSOUT=*,DCB=(RECFM=VB,LRECL=133,BLKSIZE=137)
//STDOUTL DD DISP=(,CATLG,DELETE),
// DSN=PRF.TWAS.FOGCELL.MONRPT(+1),
//       DCB=(LRECL=132,BLKSIZE=0,DSORG=PS,RECFM=FB),
// SPACE=(CYL,(5,5),RLSE),UNIT=SYSALLDA
//STDERR DD SYSOUT=*,DCB=(RECFM=VB,LRECL=133,BLKSIZE=137)
//SYSPRINT DD SYSOUT=*
//SYSTIN DD *
```

OCOPY INDD(HFSOUT) OUTDD(STDOUTL)
OCOPY INDD(HFSERR) OUTDD(STDERRL)

The FIG. 6 report is from the JCL execution in the WebSphere Cell. In this figure, the jvmTolerence was temporarily set to 50% for demonstration purposes. As can be seen, the report shows Heap Statistics sorted by JVM, with each entry including a Server, SERVANT ID, Free Memory (in MB); Total Memory (in MB); Max Memory (in MB), and whether an Alarm has been triggered. Here it is seen that that the server wfotec8 with servants (Servant ID 0000017C00000526 and 00000E2800000122) have met the alarm criteria.

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:

1. A computerized method of monitoring one or more servant regions of an application server, the method comprising:
   identifying, by a processor in electronic communication with the application server, one or more servant regions of the application server;
   requesting, by the processor, to the application server, to receive one or more performance metrics for each of the one or more servant regions, the performance metrics (a) included in a virtual resource statistics module for collecting and reporting available resource data, and (b) comprising, for each of the one or more servant regions, at least a free memory, a total memory, and a maximum total memory;
   receiving, by the processor, from the application server, first information including the one or more performance metrics for each of the one or more servant regions;
   extracting, by the processor, from the first information, the one or more performance metrics for each of the one or more servant regions of the application server; and
   determining, by the processor, based on the one or more performance metrics, whether to generate an alert message by:
   (a) determining, by the processor, for each of the one or more servant regions, when a quotient of the total memory and the maximum total memory exceeds a predetermined first threshold;
   (b) determining, by the processor, for each of the one or more servant regions, an actual free memory level; and
   (c) sending, by the processor, a first alert message to an operating system log when, for at least one servant region, (i) the quotient of the total memory and the maximum total memory exceeds the predetermined first threshold, and (ii) the actual free memory level falls below a second predetermined threshold.

2. The method of claim 1 wherein determining whether to generate an alert message further comprises:
   computing, by the processor, for each of the one or more servant regions, a quotient of the total memory and the maximum total memory; and
   when at least one quotient is below a predetermined threshold and the free memory falls below a free memory threshold level:
   generating, by the processor, a first alert message; and
   sending, by the processor, the first alert message to a first alert message receiving module.

3. The method of claim 2 wherein the first alert message receiving module is a Multiple Virtual Storage (MVS) console, an operating system log, or an alert management application.

4. The method of claim 2 further comprising sending the first alert message to an alert consolidation tool, the alert consolidation tool configured to alert appropriate personnel.

5. The method of claim 2 wherein generating the first alert message does not rely on external garbage collection cycle information.

6. The method of claim 2 wherein generating the first alert message further comprises using an algorithm to detect JVM memory exhaustion, a Jython routine using write-to-operator messages to log messages to an MVS console and a system log tagged with a unique message identifier via a Jython function.

7. The method of claim 1 wherein the one or more performance metrics include at least one of JVM heap space usage, a JVM total heap space, a JVM maximum heap space, a CPU usage, JDBC pool connections, JMS pool connections, or Threadpool connections.

8. The method of claim 1 wherein the one or more performance metrics are included in an MBean of the application server for each of the one or more servant regions.

9. The method of claim 1 wherein requesting the one or more performance metrics includes bypassing at least one of a Perf MBean or a JSR-77 object.

10. The method of claim 1 wherein the first information is provided in one or more unformatted strings including a memory in bytes for a controller of the application server, at least one memory statistic for each servant region of the application server, and a hexadecimal identifier for each servant region of the application server, and wherein extracting the one or more performance metrics from the first information includes parsing and formatting the first information to obtain at least a free memory and a total memory for each servant region.

11. The method of claim 1 further comprising creating a monitor report using a Jython script.

12. The method of claim 1 further including generating a report including one or more of a server identifier, a servant region identifier, a free space, a total space, a maximum space, or an alarm indicator.

13. The method of claim 12 wherein the report is generated using an MVS Job Control Language (JCL) script.

14. The method of claim 1 further comprising monitoring a predefined message identifier of the alert message to generate a system alert and send the system alert to a monitoring application.

15. The method of claim 1 further comprising writing detailed information relating to the application server in an MVS generation data group dataset used for at least one of data analysis or historical storage.

16. The method of claim 1 wherein determining whether to generate an alert message further comprises:
   determining, by the processor, for each servant region, when a quotient of a total heap size and a maximum heap size exceeds a predefined tolerance level;
   determining, by the processor, for each servant region, an actual free memory level; and
   sending, by the processor, a message to an operating system log when, for at least one servant region, (i) the quotient of the total heap size and the maximum heap size exceeds the tolerance level, and (ii) the free memory falls below a free memory threshold.

17. The method of claim 16 wherein the tolerance level is 98% of the maximum memory and the free memory threshold is 2% of the maximum memory if maximum memory is less than or equal to 4 GB and 1% of the maximum memory if maximum memory is greater than 4 GB.

18. The method of claim 1 further including:
generating a system alert if a specified number of alert messages is generated in a specified time interval; and
sending the system alert to an alert management tool.

19. The method of claim 18 wherein the specified number of alert messages is five and the specified time interval is twelve minutes for a case in which monitoring occurs every 90 seconds and each iteration of a script used to generate the alert messages finishes in about 15 seconds.

20. A computer-implemented system comprising an alerting module and an external server, the system configured to:
receive, by an alert interface of the alerting module, an alert message generated according to claim 1;
translate, by the alerting module, the alert message into an XML message;
send, by the alerting module, the XML message via TCP/IP to an external server;
receive, by the external server, the XML message;
interpret, by the external server, the XML message to a form displayable for a monitoring technician; and
display, by the external server, the form displayable for a monitoring technician.

21. A system for monitoring one or more servant regions of an application server, the system comprising:
an application server having a controller in electronic communication with one or more servant regions; and
a data processor in electronic communication with the application server, the data processor configured to:
identify the one or more servant regions of the application server;
request to receive one or more performance metrics for each of the one or more servant regions, the performance metrics (a) included in a virtual resource statistics module for collecting and reporting available resource data, and (b) comprising, for each of the one or more servant regions, at least a free memory, a total memory, and a maximum total memory;
receive, from the application server, first information including the one or more performance metrics for each of the one or more servant regions;
extract, from the first information, one or more performance metrics for each of the one or more servant regions of the application server; and
determine, based on the one or more performance metrics, whether to generate an alert by:
(a) determining, by the processor, for each of the one or more servant regions, when a quotient of the total memory and the maximum total memory exceeds a predetermined first threshold;
(b) determining, by the processor, for each of the one or more servant regions, an actual free memory level; and
(c) sending, by the processor, a first alert message to an operating system log when, for at least one servant region, (i) the quotient of the total memory and the maximum total memory exceeds the predetermined first threshold, and (ii) the actual free memory level falls below a second predetermined threshold.

22. A computerized method of monitoring one or more servant regions of a java virtual machine hosted on an application server, the method comprising:
identifying, by a client in electronic communication with the application server, one or more servant regions of the java virtual machine;
requesting, by the client, to the application server, to receive performance metrics for each of the one or more servant regions, the performance metrics including a JVM heap space usage, a JVM total heap space, and a JVM maximum heap space, the performance metrics included in an MBean of each of the one or more servant regions;
receiving, by the client, from the application server, first information including the performance metrics for each of the one or more servant regions;
extracting, by the client, from the first information, the performance metrics for each of the one or more servant regions of the application server; and
determining, by the client, based on the one or more performance metrics, whether to generate an alert message, by:
(a) determining, by the client, for each servant region, when a quotient of a total heap size and a maximum heap size exceeds a predefined tolerance level;
(b) determining, by the client, for each servant region, an actual free memory level; and
(c) sending, by the client, a message to an operating system log when, for at least one servant region, (i) the quotient of the total heap size and the maximum heap size exceeds the tolerance level, and (ii) the free memory falls below a free memory threshold.

23. A computerized method of monitoring one or more servant regions of an application server, the method comprising:
identifying, by a processor in electronic communication with the application server, one or more servant regions of the application server;
requesting, by the processor, to the application server, to receive one or more performance metrics for each of the one or more servant regions, the performance metrics included in a virtual resource statistics module for collecting and reporting available resource data;
receiving, by the processor, from the application server, first information including the one or more performance metrics for each of the one or more servant regions;
extracting, by the processor, from the first information, the one or more performance metrics for each of the one or more servant regions of the application server;
determining, by the processor, based on the one or more performance metrics, whether to generate an alert message;
generating a system alert when a specified number of alert messages is generated in a specified time interval; and
sending the system alert to an alert management tool.

* * * * *